United States Patent [19]

Krueger et al.

[11] Patent Number: 5,231,644
[45] Date of Patent: Jul. 27, 1993

[54] SLAB OR STRIPLINE GAS LASER

[75] Inventors: Hans Krueger, Munich; Hubert Weber, Augsburg, both of Fed. Rep. of Germany

[73] Assignee: Siemens Aktiengesellschaft, Munich, Fed. Rep. of Germany

[21] Appl. No.: 759,510

[22] Filed: Sep. 13, 1991

[30] Foreign Application Priority Data

Sep. 26, 1990 [DE] Fed. Rep. of Germany ....... 4030445

[51] Int. Cl.⁵ .............................................. H01S 3/08
[52] U.S. Cl. ..................................... 372/107; 372/87; 372/99; 372/92; 372/97; 372/64; 372/65
[58] Field of Search ............................ 372/69–72, 372/65, 107, 108, 64, 98, 99, 92, 87, 97

[56] References Cited

U.S. PATENT DOCUMENTS

| | | | |
|---|---|---|---|
| 4,719,639 | 1/1988 | Tulip | 372/66 |
| 4,787,090 | 11/1988 | Newman et al. | 372/82 |
| 4,847,854 | 7/1989 | Van Dijk | 372/99 |
| 4,939,738 | 7/1990 | Opower | 372/95 |

*Primary Examiner*—Léon Scott, Jr
*Attorney, Agent, or Firm*—Hill, Steadman & Simpson

[57] ABSTRACT

Slab or stripline gas laser. A slab or stripline gas laser that contains two laser mirrors (4, 5) has a single construction that is extremely mode-stable. The gas laser has a first electrode (1) that carries laser mirrors (4, 5) and that is connected to the laser mirrors (4, 5) in a fixed angular position, and a second electrode (13) that is mechanically fixed relative to the first electrode but is positioned such that it does not contact the laser mirrors (4, 5). The laser structure can be used in $CO_2$ waveguide lasers.

20 Claims, 1 Drawing Sheet

SLAB OR STRIPLINE GAS LASER

BACKGROUND OF THE INVENTION

The present is directed to a slab or stripline gas laser that contains two resonator mirrors and two electrodes with two waveguide surfaces that lie opposite the electrodes, that define a plasma space and that proceed parallel to the electrodes, whereby a first electrode is connected to the mirrors in a fixed angular position. Such a laser is disclosed by German Published Application 37 29 053. Both electrodes therein are firmly connected to the resonator mirrors.

SUMMARY OF THE INVENTION

It is an object of the present invention to provide an improvement in the mode purity of such mirrors with little outlay. This object is achieved by a laser in which the first electrode carries the mirrors and in which a second electrode is mechanically fixed relative to the first electrode but is positioned such that it does not contact the laser mirrors. Differences in the expanse of the electrodes as a consequence of temperature fluctuations do not result in tilting of the mirrors and therefore also do not deteriorate the mode purity of the laser emission. Moreover, the arrangement of the present invention can be kept constant to such an extent on the basis of a correspondingly designed cooling of the first electrode that the mutual position of the mirrors does not change during operation. The mirrors are thereby advantageously composed of metal, particularly copper, whereby a distance adequate for electrical insulation is present between the laser mirrors and the second electrode. The metal mirrors can thereby be joined to the first electrode by an electrically insulating layer, for example a glue layer. In many instances, this does not have any significant, disturbing effect on the mode purity, particularly when the layer is thin and is composed of a material having good thermal conductivity.

Advantageously, the first electrode is at least partially composed of a material having an extremely low coefficient of thermal expansion. In particular, a structure can be realized wherein a first laser mirror is firmly mounted on the first electrode and a second laser mirror is movable in beam direction of the laser relative to the first electrode, whereby the movable, second laser mirror is held at a constant distance from the first laser mirror by at least one spacer having an extremely low coefficient of thermal expansion. An embodiment is also advantageous wherein the first electrode is composed of two plates adjoining one another in the beam direction, wherein these plates are movable relative to one another in the beam direction but are secured against any other, mutual positional change, and wherein the mutual spacing of these plates is defined by spacers, the spacers keeping the mutual spacing of the laser mirrors constant. The plates are thereby advantageously joined to one another by elements that are resilient in the beam direction.

Rods, bands or wires proceeding parallel to the plates in the beam direction are thereby advantageously provided as spacers. For example, Invar, Zerodur or special carbon fiber rods are suitable as materials for the spacers. It is advisable to protect the spacers against corrosion by the laser gas. In the case of Invar, a resistant coating, for example a voltaically applied layer of nickel or gold or a plasma-sprayed $Al_2O_3$ layer, is advantageously applied for this purpose. Given the employment of carbon fiber rods, a metallization of the surface or an encapsulation in a metal tube that is plasma-stable or coated plasma-stable is advisable. The metal tube can be advantageously composed of two parts and can be provided with a bellows between these two parts, the bellows accommodating the differences in expansion between the spacers and the tube parts. An advantageous embodiment having a corrosion-protected spacer has the feature that one or more spacers are guided in bores of the plates with which the electrodes are formed. The cavities are thereby advantageously formed by tubes that proceed in the beam direction and are arranged laterally adjoining the plates.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
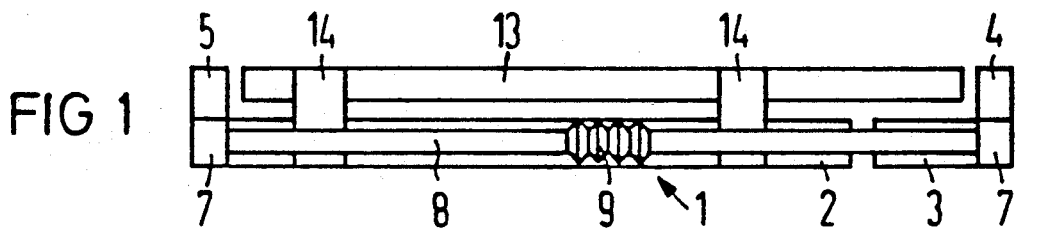
FIG. 1 is a side view of one embodiment of the laser of the present invention.
Figure 2:
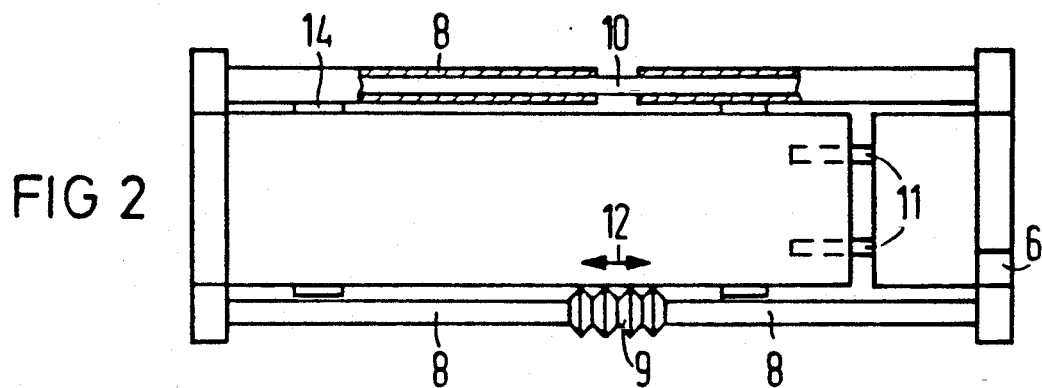
FIG. 2 is a top view of the FIG. 1 embodiment.

A first electrode 1 is composed of two plates 2 and 3 the plates 2 and 3 are joined to one another by fixing pins 11, whereby the plates 2 and 3 can be displaced relative to one another in the direction 12 of the laser beam. The first electrode 1 carries laser mirrors 4 and 5 that leave a gap free to the second electrode 13 that is adequate for insulation under operating conditions, and a window 6 for the laser emission. The second electrode 13 is joined via spacers 14 to the plate 2 of the first electrode. To guarantee a stable holding of the second electrode 13, the plate 2 is fashioned longer than the plate 3. Two rods 10 having an extremely low coefficient of thermal expansion are rigidly connected via mounts 7 to the two plates 2 and 3 of the first electrode. The rods 10 are protected from the environment and, thus, from the influences of the plasma during operation by tube sections 8 that proceed from the mounts 7 and by a bellows 9. The rods 10 are advantageously composed of Invar or of Zerodur or of carbon fibers. The tubes 8 and the bellows 9 can be composed of metal, whereby at least the outer layer facing toward the plasma is composed of nickel, gold or is composed of a plasma-sprayed $Al_2O_3$ layer. The layers can also be directly applied on the rod 10 and the tubes 8 can be eliminated in this case. Bands of the materials can also be utilized instead of the rods 10.

Figure 3:
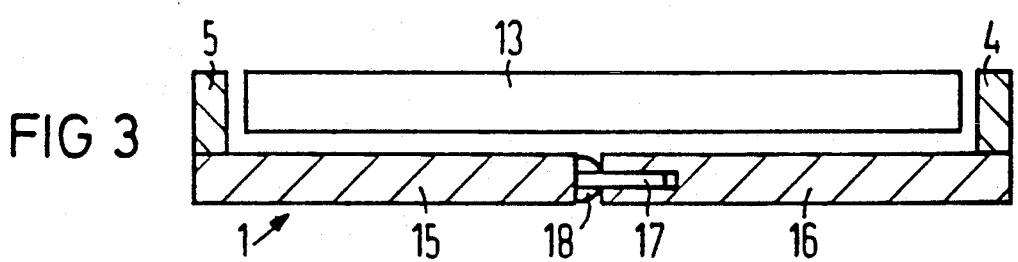
FIG. 3 is a cross-sectional view of another embodiment of the laser of the present invention.
Figure 4:
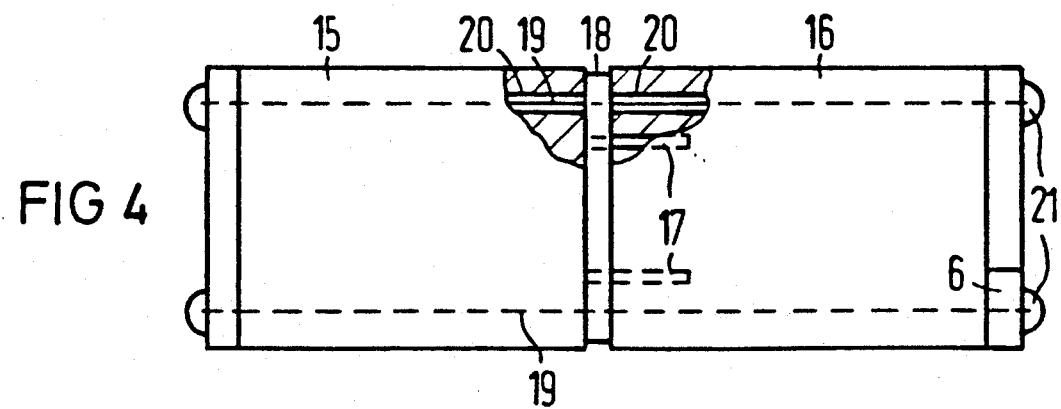
FIG. 4 is a partially broken away top view of the FIG. 3 embodiment.

In the example of FIGS. 3 and 4, plates 15 and 16 of the first electrode are connected to one another by fixing pins 17 so that they are movable in the beam direction and are forced apart by a leaf spring 18. A respective band or wire 19 composed of a material having an extremely low coefficient of thermal expansion proceeds in bores 20 of the plates 15 and 16 and is tensed relative to the spring pressure of the leaf spring 18 by clamping mechanisms 21. A well-protected arrangement of the wire 19 and a compact structure of the electrode 1 thus results. The fixing pins 17 in this structure serve the purpose of protecting against a tilting of the plates 16 and 17 and can be replaced by other mechanical elements that fulfill the same purpose.

The wires 19 or, respectively, the rods 10 serve as spacers for the spacing of the mirrors. The remaining parts of the electrode, particularly the plates 2 and 3 or, respectively, 15 and 16, can be composed of an arbitrary, plasma-resistant material. Copper is especially suitable for this purpose, this having the additional advantage of high thermal conductivity.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A stripline laser having two resonator mirrors, two electrodes that lie opposite one another and two waveguide surfaces that proceed parallel to the two electrodes, the two waveguide surfaced defining a plasma space containing a laser beam, comprising: a first electrode of the two electrodes being connected to the mirrors in a fixed angular position; and a second electrode of the two electrodes connected to and mechanically fixed relative to the first electrode and positioned such that the second electrode does not contact the mirrors, the second electrode being opposite the first electrode at a fixed distance.

2. The laser according to claim 1, wherein the mirrors are composed of metal, and wherein a spacing adequate for electrical insulation is present between the mirrors and the second electrode.

3. The laser according to claim 2, wherein the mirrors are composed of copper.

4. The laser according to claim 1, wherein the first electrode is at least partially composed of a material having an extremely low coefficient of thermal expansion.

5. The laser according to claim 4, wherein a first mirror of the two resonator mirrors is rigidly mounted on the first electrode; wherein a second mirror of the two resonator mirrors is movable in a beam direction of the laser beam relative to the first electrode, the first electrode having means for said moving of the second mirror; and wherein the movable, second mirror is held at a constant spacing from the first mirror by at least one spacer having an extremely low coefficient of thermal expansion.

6. The laser according to claim 5, wherein the at least one spacer is guided in a bore of the first electrode.

7. The laser according to claim 4, wherein the first electrode is composed of two plates adjoining one another in a beam direction of the laser beam; wherein the two plates are movable relative to one another only in the beam direction; and wherein a mutual spacing of the two plates is defined by at least one spacer having an extremely low coefficient of thermal expansion that keeps the mutual spacing of the mirrors constant.

8. The laser according to claim 7, wherein the two plates are joined to one another by elements that are resilient in the beam direction.

9. The laser according to claim 7, wherein rods, bands or wire proceeding parallel to the plates in the beam direction are provided as spacers.

10. The laser according to claim 7, wherein the laser further comprises means for protecting the at least one spacer against corrosion caused by laser gas produced by the laser beam.

11. The laser according to claim 10, wherein the at least one spacer is composed of carbon fibers; and wherein the means for protecting the as least one spacer is a layer of An, Au or plasma-sprayed $Al_2O_3$ that is applied onto the at least one spacer for protection against corrosion.

12. The laser according to claim 7, wherein the laser further comprises at least two cavities, the at least one spacer being guided in the two cavities; wherein the two cavities are in the two plates, respectively, of the first electrode that are movable relative to one another; and wherein the two cavities are connected to one another by a bellows and are terminated gas-tight relative to the plasma space defined by the two waveguide surfaces.

13. The laser according to claim 12, wherein the two cavities are formed by tubes that proceed in the beam direction and are arranged laterally adjoining the two plates.

14. The laser according to claim 7, wherein the at least one spacer is guided in a bore of the first electrode.

15. A stripline laser having two resonator mirrors, two electrodes that lie opposite one another and two waveguide surfaces that proceed parallel to the two electrodes, the two waveguide surfaces defining a plasma space containing a laser beam, comprising a first electrode of the two electrodes being connected to the mirrors in a fixed angular position, the first electrode at least partially composed of a material having an extremely low coefficient of thermal expansion; and a second electrode of the two electrodes connected to and mechanically fixed relative to the first electrode and positioned such that the second electrode does not contact the mirrors; a first mirror of the two resonator mirrors rigidly mounted on the first electrode and a second mirror of the two resonator mirrors movable in a beam direction of the laser beam relative to the first electrode and the movable, second mirror held at a constant spacing from the first mirror by at least one spacer having an extremely low coefficient of thermal expansion, the first electrode having means for said moving of the second mirror.

16. The laser according to claim 15, wherein the at least one spacer is guided in a bore of the first electrode.

17. A stripline laser having two resonator mirrors, two electrodes that lie opposite one another and two waveguide surfaces that proceed parallel to the two electrodes, the two waveguide surfaces defining a plasma space containing a laser beam, comprising: a first electrode of the two electrodes being connected to the mirrors in a fixed angular position, the first electrode at least partially composed of a material having an extremely low coefficient of thermal expansion; and a second electrode of the two electrodes connected to and mechanically fixed relative to the first electrode and positioned such that the second electrode does not contact the mirrors; the first electrode composed of two plates adjoining one another in a beam direction of the laser beam, the two plates being movable relative to one another only in the beam direction; and a mutual spacing of the two plates defined by at least one spacer having an extremely low coefficient of thermal expansion that keeps the mutual spacing of the mirrors constant.

18. The laser according to claim 17, wherein the two plates are joined to one another by elements that are resilient in the beam direction.

19. The laser according to claim 17, wherein the laser further comprises at least two cavities, the at least one spacer being guided in the two cavities; wherein the two cavities are in the two plates, respectively, of the first electrode that are movable relative to one another; and wherein the two cavities are connected to one another by a bellows and are terminated gas-tight relative to the plasma space defined by the two waveguide surfaces.

20. The laser according to claim 19, wherein the two cavities are formed by tubes that proceed in the beam direction and are arranged laterally adjoining the two plates.

* * * * *